(12) United States Patent
Kuehn et al.

(10) Patent No.: US 7,691,766 B2
(45) Date of Patent: Apr. 6, 2010

(54) MATERIAL, PARTICULARLY FOR AN OPTICAL COMPONENT FOR USE IN MICROLITHOGRAPHY, AND METHOD FOR MAKING A BLANK FROM THE MATERIAL

(75) Inventors: Bodo Kuehn, Gelnhausen (DE); Stefan Ochs, Bad Camberg (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 144 days.

(21) Appl. No.: 11/788,007

(22) Filed: Apr. 18, 2007

(65) Prior Publication Data

US 2007/0248522 A1    Oct. 25, 2007

(30) Foreign Application Priority Data

Apr. 20, 2006  (DE) .................. 10 2006 018 711

(51) Int. Cl.
- C04B 35/00    (2006.01)
- C04B 35/14    (2006.01)
- C04B 35/16    (2006.01)
- C01B 15/14    (2006.01)
- C01B 33/12    (2006.01)

(52) U.S. Cl. .................. 501/154; 501/133; 423/325; 423/335

(58) Field of Classification Search .................. 501/54, 501/133, 154; 423/324, 325, 335; 428/426
See application file for complete search history.

(56) References Cited

U.S. PATENT DOCUMENTS

| 5,664,133 | A | * | 9/1997 | Malamud et al. ............ 715/816 |
| 5,876,473 | A | * | 3/1999 | Inaki et al. .................. 65/32.1 |
| 5,879,811 | A |   | 3/1999 | Tanaka et al. |
| 6,121,173 | A | * | 9/2000 | Terashi ......................... 501/4 |
| 6,242,117 | B1 | * | 6/2001 | Koga et al. .................. 428/701 |
| 6,660,671 | B2 | * | 12/2003 | Werdecker et al. ............ 501/32 |
| 2003/0027055 | A1 | * | 2/2003 | Ball et al. ...................... 430/5 |
| 2006/0046075 | A1 |   | 3/2006 | Maul et al. |

FOREIGN PATENT DOCUMENTS

EP    0 693 580 B1    3/1999

OTHER PUBLICATIONS

Ito et al. Water distribution in low-grade siliceous metamorphic rocks by miro-FTIR and its relation to grain size: a case from the Kanto Mountain region, Japan. Chemical Geology 189 (2002) 1-18.*

Hofmann et al. Origin of 3.45 Ga coniform stromatolites in Warrawoona Group, Western Austrailia. Geological Society of America Bulletin. vol. 111, No. 8 (Aug. 1999) 1256-1262.*

Bliss et al, Measurement of infrared spectra of dense ceramics by specular reflectance spectroscopy. J. Amer. Ceram. Soc. 73:1078-1083 (1990).

* cited by examiner

*Primary Examiner*—Karl E Group
*Assistant Examiner*—Noah S Wiese
(74) *Attorney, Agent, or Firm*—Tiajoloff & Kelly LLP

(57) ABSTRACT

The invention is concerned with a material which shows low absorption for UV radiation having a wavelength below 250 nm, low birefringence, high chemical resistance and high radiation resistance and which is therefore particularly usable for making optical components for microlithography. According to the invention the material consists of synthetically produced quartz crystallites which form a polycrystalline structure and have a mean grain size in the range between 500 nm and 30 μm. The method according to the invention for making a blank from the material comprises providing granules consisting of synthetically produced quartz crystals having a mean grain size in the range between 500 nm and 30 μm, and sintering the granules to obtain a blank of polycrystalline quartz.

15 Claims, No Drawings

MATERIAL, PARTICULARLY FOR AN OPTICAL COMPONENT FOR USE IN MICROLITHOGRAPHY, AND METHOD FOR MAKING A BLANK FROM THE MATERIAL

The present invention relates to a material, particularly for an optical component for use in microlithography, and to a method for making a blank from the material.

The optical components made from the material according to the present invention are generally used for the transmission of high-energy ultraviolet radiation, especially in exposure and projection optics of microlithography devices within the scope of making large-scale integrated circuits for semiconductor chips. The achievable resolution of the exposure or projection objective depends on the operating wavelength. At the moment microlithography devices are predominantly equipped with excimer lasers which emit UV radiation of a wavelength of 248 nm (KrF laser) or of 193 nm (ArF laser).

On account of its mechanical and chemical resistance and its low birefringence, quartz glass is a preferred material for making high-quality optical components. In optical components made from quartz glass, short-wave UV radiation may however produce defects leading to absorptions. Type and extent of a defect formation depend on the type and quality of the respective quartz glass, which is essentially determined by structural properties, such as density, refractive index profile, homogeneity and chemical composition. Therefore, with further increasing demands made on radiation resistance or with a progressive shortening of the operating wavelength, physical limits and limits due to the material must also be expected in the case of quartz glass.

As an alternative to quartz glass, synthetically produced crystalline materials that are transparent to short-wave UV radiation and are distinguished by high UV radiation resistance are being tested as lens material. Crystalline fluorides such as potassium fluoride ($CaF_2$) or barium fluoride ($BaF_2$), crystalline alkaline earth oxides, particularly MgO, as well as single crystalline or polycrystalline spinel ($MgAl_2O_4$) should here be mentioned as examples. However, it has been found that even single crystals with cubic lattice structure at short-wave UV radiation show considerable intrinsic birefringence which significantly impairs the imaging fidelity of the optical component made therefrom.

However, many crystalline materials (such as $CaF_2$), which with respect to their UV radiation resistance and transparency would as such be suited for use in microlithography, show a poor chemical resistance. This is above all a drawback when the optical component made from the crystal is in contact with a liquid, for instance in the case of microlithographic projection systems operating according to the technique of the so-called "immersion lithography". The gap between the last optical component of the lens system and the substrate to be exposed is here filled with a liquid having a higher refractive index than air.

A further difficulty is due to the standard manufacture of artificial crystals through a crucible melting method, known as the Bridgman method, which may lead to an input of impurities out of the crucible material into the crystal and may thereby produce absorption bands in the range of the operating wavelength.

It is therefore the object of the present invention to provide a material for making an optical component, the material showing low absorption for UV radiation having a wavelength below 250 nm, low birefringence, high chemical resistance and high radiation resistance, and being therefore particularly usable for making optical components for microlithography.

Furthermore, it is the object of the present invention to indicate a method for making such a material.

As for the material, this object is achieved according to the invention in that the material consists of synthetically produced quartz crystallites which form a polycrystalline structure and have a mean grain size in the range between 500 nm and 30 μm.

The polycrystalline material according to the invention consists of synthetically produced quartz crystallites of a specific grain size range.

The synthetic production of the quartz crystallites permits a high purity of the material and thus an adequate transparency in the wavelength range below 250 nm up to about 150 nm.

The specific grain size of the quartz crystallites shows several important aspects:

a) The light passage through the polycrystalline quartz structure is reduced by diffuse scattering on pores and additional light scattering by birefringence at each transition of the light beam from one into the next crystallite of the structure.

Normally, crystalline quartz is present in the trigonal α-quartz phase which is stable at normal pressure up to a temperature of 573° C. In this polycrystalline quartz material the scattering amount based on birefringence is reduced by small structure grain sizes. This yields a maximum mean size of the quartz crystallites of 30 μm.

b) On the other hand, during light passage through the polycrystalline quartz structure a loss portion is also observed due to scattering on grain boundaries. Therefore, light scattering increases with an increasing number of grain limits and thus with an increasing number of quartz crystallites per volume unit. This yields a minimal mean size of the quartz crystallites of 0.5 μm.

c) Moreover the effect of birefringence of each individual quartz crystallite is eliminated by the statistic distribution of the orientation of the individual crystallites in the polycrystalline structure, so that the optical component produced from the material shows low birefringence of less than 1 nm/cm on the whole.

Moreover, what is particularly important is that, due to its crystalline structure, the polycrystalline $SiO_2$ material has a distinctly higher resistance to short-wave UV radiation as compared with quartz glass.

For the determination of the mean grain size of the quartz crystallites a standard software-controlled image evaluation is primarily possible or also counting according to the so-called circle method.

The crystalline $SiO_2$ material according to the invention is suited for producing an optical component, particularly for microlithography, including immersion lithography, on account of its high transparency in the short-wave UV range, its UV radiation resistance and its chemical resistance.

Particularly with respect to the use of the material of the invention for producing optical components for use with radiation within the short-wave UV wavelength range, it has turned out to be useful when the quartz crystallites have a mean grain size in the range between 750 nm and 20 μm, preferably a mean grain size in the range between 1 μm and 15 μm, and particularly preferably a mean grain size in the range between 2 μm and 10 μm.

The upper and lower limits of these grain size ranges follow, according to the above-explained observations regarding the scattering amount due to birefringence, the loss portion of the transmission due to scattering on grain boundaries, the reduction of the effect of birefringence, from the statistic distribution of the crystallite orientation.

As for a low scattering, it has turned out to be advantageous when the material has a total porosity of less than 1 ppm.

In this context the size of possible pores in the material also plays a central role. Advantageously, the size of existing pores is less than 1 µm, preferably less than 0.5 µm.

As for the method for making a blank from the material, the above-mentioned object is achieved according to the invention by a method comprising the following measures:

(A) providing granules consisting of synthetically produced quartz crystals having a mean grain size in the range between 500 nm and 30 µm, and (B) sintering the granules to obtain a blank of polycrystalline quartz.

For preparing a material for an optical component according to the present invention granules of synthetically produced quartz crystals having a specific grain size range are sintered.

The synthetic production of the quartz crystals achieves a high purity of the material and thus an adequate transparency in the wavelength range below 250 nm to about 150 nm.

During sintering of the quartz crystals to obtain a blank of polycrystalline quartz the grain size thereof does not change or varies only little. The sintered polycrystalline blank thus consists of quartz crystallites having a mean grain size ranging from 500 nm to 30 µm, whereby the effects described above with reference to the material according to the invention and regarding reduced light scattering and birefringence are achieved.

The material prepared in this way is distinguished by reason of its crystalline structure by a resistance to short-wave UV radiation that is much higher in comparison with quartz glass.

The polycrystalline $SiO_2$ material produced according to the invention is suited by virtue of its high transparency in the short-wave UV range, its UV radiation resistance and its chemical resistance for the production of an optical component, particularly for microlithography, including immersion lithography.

In a preferred embodiment of the manufacturing method of the invention, providing the quartz crystal granules according to measure (A) comprises the following method steps:

(a) forming amorphous $SiO_2$ by hydrolysis or oxidation of a silicon compound which is vaporizable in the temperature range of up to 500° C., (b) using the amorphous $SiO_2$ as a raw material for preparing synthetic quartz seed crystal, and (c) using the quartz seed crystal for forming quartz crystal granules.

In a first method step, amorphous $SiO_2$ particles are formed by means of the known plasma or CVD deposition methods (OVD, VAD, MCVD PCVD, or the like), wherein a synthetic silicon compound that is vaporizable up to 500° C. is used as the glass start material and amorphous $SiO_2$ particles are formed therefrom.

Thanks to the vaporizability of the synthetic silicon compound at a temperature below 500° C., which can still be handled easily, a relatively easy ultrapure preparation of the compound can be achieved. This has a particularly advantageous effect on the purity of the amorphous $SiO_2$ particles.

The particulate or massive $SiO_2$ raw material produced in this way is used for making synthetic quartz seed crystals. The amorphous $SiO_2$ raw material is here transformed into crystalline material, the known methods for crystal synthesis by growing from the melt, growing from solutions and ceramic growing methods being suited. The synthetically produced glass start material ensures a high purity both of the amorphous $SiO_2$ particles and the $SiO_2$ raw material produced therefrom, and also of the synthetic quartz seed crystal. The synthetic quartz seed crystal produced in this way is present in single crystalline form, in polycrystalline form or as a multitude of crystals (single-crystalline or polycrystalline).

The quartz seed crystal is directly used as quartz crystal granulation on condition that the grain size is directly suited, or it is processed into the quartz crystal granules.

It has turned out to be particularly advantageous when the formation of amorphous $SiO_2$ according to method step (a) comprises depositing $SiO_2$ particles with formation of a massive preform of amorphous $SiO_2$.

This is a generally known and proven method step for making blanks of synthetic quartz glass for producing components for use in optics or in telecommunication engineering.

The massive glass-like preform of synthetic $SiO_2$ is subsequently used as a raw material for making synthetic quartz seed crystal.

This normally requires a mechanical or chemical breaking open of the preform. Hence, the use of the amorphous $SiO_2$ as a raw material for producing the synthetic quartz seed crystal according to method step (b) preferably comprises a breaking open of the preform of amorphous $SiO_2$, whereby the same is reduced in size or dissolved.

The preform can be broken open in a particularly easy manner when the preform is formed from porous $SiO_2$.

Such preforms of porous $SiO_2$ are also designated as "soot bodies". The formation of the preform as a porous soot body permits or simplifies subsequent processing, cleaning or doping, if desired. A dehydration treatment for reducing the hydroxyl group content should here be particularly mentioned.

On the other hand, porous soot bodies tend to absorb substances from the environment, which makes their storing and handling difficult. It has therefore turned out to be also useful when the preform is made from transparent or opaque quartz glass having a density of at least 2.1 g/cm$^3$.

The high density reduces the risk of contamination of the $SiO_2$ prior to the use of the preform as a start material for crystal growing.

It has turned out to be useful when the production of the synthetic quartz seed crystal according to method step (b) is carried out by way of a hydrothermal method.

In quartz crystal growing in the hydrothermal method according to the invention, a solution of the amorphous $SiO_2$ is produced in the hotter area of a pressure vessel, the solution being fed by the synthetically produced amorphous $SiO_2$. In the colder area of the pressure vessel, one or more crystallization seeds are arranged on which due to the temperature gradient in the pressure vessel synthetic quartz crystal crystallizes. A crystal pulling from the melt and the accompanying risk of contamination caused by the crucible material can thus be avoided. It is also because of the high-purity start material that the resulting quartz seed crystal is distinguished by a particularly high purity.

As a rule, quartz seed crystal is obtained with a grain size that is too large for the intended use. In this case the processing of the quartz seed crystal into quartz crystal granules according to method step (c) preferably comprises a crushing of the quartz seed crystals.

The crushing of the quartz seed crystal is carried out in the simplest case with mechanical means by grinding, shaking, ultrasound, or the like, and the crushing effect may here be supported by thermal measures (quenching) or chemical means (etchants).

Particularly with respect to the use of the material of the invention for making optical components for use with radiation in the short-wave UV wavelength range it has turned out to be useful when synthetically produced quartz crystals are provided with a mean grain size in the range between 750 nm and 20 µm, preferably with a mean grain size in the range between 1 µm and 15 µm, and particularly preferably with a mean grain size in the range between 2 µm and 10 µm.

In a particularly preferred variant of the method the sintering of the quartz crystal granules to obtain a blank according to measure (B) comprises gas pressure sintering.

During gas pressure sintering the quartz crystal granules to be sintered are heated under increased pressure and heated in this process at a temperature below the melting temperature of quartz. The overpressure accelerates the sintering process and reduces possible pore formation. This reproducibly yields a crystalline material which has a total porosity of less than 1 ppm. The pore size of possible residual pores is less than 1 µm, preferably less than 0.5 µm.

It has turned out to be advantageous when the blank is treated for an optical component, the treatment comprising a removal of edge portions of the blank.

The edge portion of the blank may differ in its thermal properties and its chemical composition from the inner volume, which may lead to undesired elastic stresses in the blank. Preferably, so much edge volume is removed from the blank that the polycrystalline blank is already present in an almost final dimension for the component to be produced. To this end, compared with the final dimension of the blank, the blank has an allowance of at least 10% (based on the respective dimension prior to the removal of the allowance). For the elimination of residual stresses, it is advantageous to anneal the blank, the annealing process being preferably carried out prior to the removal of the edge volume.

The invention will now be explained in more detail with reference to an embodiment. A lens for a projection system for immersion microlithography is here produced.

1. Preparing Granules from Synthetically Produced Quartz Crystals 1.1 Forming Amorphous $SiO_2$ by Flame Hydrolysis of $SiCl_4$ An $SiO_2$ soot body is produced according to the so-called OVD method, as is otherwise standard in the manufacture of quartz glass bodies from synthetic $SiO_2$. For this purpose $SiO_2$ particles are deposited layer by layer on a carrier rotating about its longitudinal axis by reciprocating an assembly of deposition burners. The deposition burners are here fed with $SiCl_4$ as glass start material and said material is hydrolyzed in a burner flame in the presence of oxygen into $SiO_2$.

After completion of the deposition process and removal of the carrier a hollow cylindrical soot body is obtained which for removing the hydroxyl groups introduced due to the production process is subjected to a dehydration treatment. To this end the soot tube is introduced in vertical orientation into a dehydration furnace and is treated at a temperature in the range around 1200° C. in vacuum.

The treatment period is about three hours, resulting in a hydroxyl group concentration of about 20 wt ppm.

The $SiO_2$ soot body treated in this way is then vitrified in a vitrification furnace at a temperature in the range of about 1,600° C. into a transparent quartz glass body and said body is subsequently comminuted in a mill having an inner lining of quartz glass, fragments being here obtained within a wide size range.

1.2 Insertion of the Quartz Glass Fragments for the Synthesis of Seed Crystals

The quartz glass fragments are used as raw material for making synthetic quartz crystals according to the "hydrothermal method".

In a vertically oriented autoclave a pressure of 120 bar and a temperature gradient between 350° C. (upper portion) and 400° C. (lower portion) is produced. In the lower portion the quartz glass fragments are dissolved in a slightly alkaline solution. In the upper portion of the autoclave quartz glass plates cut in oriented fashion are arranged as seeds. Due to the temperature gradient from the bottom to the top the quartz glass dissolved in the lower portion will condense on the quartz plates with formation of a synthetic quartz seed crystal at a crystal growth rate of about 1.5 mm/day.

The quartz seed crystal prepared in this way is distinguished by a particularly high purity. The following typical impurity contents are measured (data in brackets in wt ppb): Li (100), Na (15), K (<20), Mg (<20), Ca (<30), Fe (70), Cu (<10), Ti (<10), and Al (20).

1.3 Use of the Quartz Seed Crystal for Forming the Quartz Crystal Granules

The quartz seed crystal prepared in this way is ground in a mill having an inner lining of quartz glass in a dry milling method to obtain a fine powder of synthetic quartz crystal. The fine portion having grain sizes below 100 nm is separated from the powder obtained. The resulting quartz granules have a mean diameter of 5 µm and consist essentially of round grains.

2. Sintering the Quartz Crystal Granules to Obtain Polycrystalline Quartz

The resulting synthetic quartz crystal granules serve as start material for producing a blank from polycrystalline quartz by gas pressure sintering.

The synthetic granules are here put into a graphite mold and are treated at a temperature of 1600° C. The graphite mold is first heated to a sintering temperature of 1,600° C. while maintaining a negative pressure of less than 1 mbar. After the sintering temperature has been reached, an overpressure of 10 bar is set in the furnace and the mold is kept at said temperature for about 3 hours. Cooling to a temperature of 400° C. is subsequently carried out at a cooling rate of 2° C./min, the overpressure being further maintained. Free cooling to the room temperature is then carried out.

This yields a homogeneous stress-free solid cylinder of polycrystalline transparent quartz with a residual porosity of 0.5 ppm, the quartz crystallites having a mean grain size of around 5 µm.

The solid cylinder has an outer diameter of 300 mm and a height of 80 mm. It is treated to obtain a lens blank for a projection objective in that an edge layer of 5 mm is ground off from the faces, and an edge layer having a thickness of 20 mm from the outer cylindrical surface.

The projection objective is distinguished by high transparency in the short-wave UV range, high UV radiation resistance and excellent chemical resistance to almost all media and is therefore suited for use in microlithography, particularly as the last optical component with contact with the immersion liquid in immersion lithography.

The invention claimed is:

1. A material for an optical component, said material consisting essentially of synthetically produced quartz crystallites that form a polycrystalline structure and that have a mean grain size in a range between 500 nm and 30 µm.

2. The material according to claim 1, wherein the quartz crystallites have a mean grain size in a range between 750 nm and 20 μm.

3. A material for an optical component, said material comprising synthetically produced quartz crystallites that form a polycrystalline structure and that have a mean grain size in a range between 500 nm and 30 μm, wherein said material has a total porosity of less than 1 ppm.

4. The material according to claim 1, wherein quartz crystallites have pores with a size less than 1 μm.

5. The material of claim 1, wherein the material is used for an optical component in microlithography.

6. The material according to claim 1, wherein the quartz crystallites have a mean grain size in a range between 1 μm and 15 μm.

7. The material according to claim 1, wherein the quartz crystallites have a mean grain size in a range between 2 μm and 10 μm.

8. The material according to claim 1, wherein the quartz crystallites have pores with a size less than 0.5 μm.

9. The material according to claim 1, wherein said material has a total porosity of less than 1 ppm.

10. The material according to claim 3, wherein the quartz crystallites have a mean grain size in a range between 750 nm and 20 μm.

11. The material according to claim 3, wherein the quartz crystallites have pores with a size less than 1 μm.

12. The material of claim 3, wherein the material is used for an optical component in microlithography.

13. The material according to claim 3, wherein the quartz crystallites have a mean grain size in a range between 1 μm and 15 μm.

14. The material according to claim 3, wherein the quartz crystallites have a mean grain size in a range between 2 μm and 10 μm.

15. The material according to claim 3, wherein the quartz crystallites have pores with a size less than 0.5 μm.

* * * * *